(12) United States Patent
Ambroladze et al.

(10) Patent No.: US 11,042,483 B2
(45) Date of Patent: Jun. 22, 2021

(54) EFFICIENT EVICTION OF WHOLE SET ASSOCIATED CACHE OR SELECTED RANGE OF ADDRESSES

(71) Applicant: International Business Machines Corporation, Armonk, NY (US)

(72) Inventors: Ekaterina M. Ambroladze, Somers, NY (US); Robert J. Sonnelitter, III, Mount Vernon, NY (US); Deanna P. D. Berger, Hyde Park, NY (US); Vesselina Papazova, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/395,493

(22) Filed: Apr. 26, 2019

(65) Prior Publication Data
US 2020/0341902 A1 Oct. 29, 2020

(51) Int. Cl.
*G06F 12/08* (2016.01)
*G06F 12/0891* (2016.01)
(Continued)

(52) U.S. Cl.
CPC ...... *G06F 12/0891* (2013.01); *G06F 12/0808* (2013.01); *G06F 12/0815* (2013.01)

(58) Field of Classification Search
CPC ............. G06F 12/0891; G06F 12/0808; G06F 12/0815
See application file for complete search history.

(56) References Cited

U.S. PATENT DOCUMENTS

| 4,373,179 A | 2/1983 | Katsumata |
| 5,410,668 A | 4/1995 | Hilton |

(Continued)

FOREIGN PATENT DOCUMENTS

| WO | 9510083 A1 | 4/1995 |
| WO | 2007081661 A2 | 7/2007 |

(Continued)

OTHER PUBLICATIONS

Ansari, et al., "Maximizing Spare Utilization by Virtually Reorganizing Faulty Cache Lines", IEEE Transactions on computers, vol. 60, No. 1, Jan. 2011, Copyright 2011, (15 pages).

(Continued)

*Primary Examiner* — Hiep T Nguyen
(74) *Attorney, Agent, or Firm* — Cantor Colburn LLP; William Kinnaman

(57) ABSTRACT

A computer system includes a cache and processor. The cache includes a plurality of data compartments configured to store data. The data compartments are arranged as a plurality of data rows and a plurality of data columns. Each data row is defined by an addressable index. The processor is in signal communication with the cache, and is configured to operate in a full cache purge mode and a selective cache purge mode. In response to invoking one or both of the full cache purge mode and the selective cache purge mode, the processor performs a pipe pass on a selected addressable index to determine a number of valid compartments and a number of invalid compartments, and performs an eviction operation on the valid compartments while skipping the eviction operation on the invalid compartments.

20 Claims, 4 Drawing Sheets

(51) Int. Cl.
*G06F 12/0815* (2016.01)
*G06F 12/0808* (2016.01)

(56) References Cited

U.S. PATENT DOCUMENTS

| | | | |
|---|---|---|---|
| 5,890,217 A | 3/1999 | Kabemoto et al. | |
| 6,173,367 B1* | 1/2001 | Aleksic | G06F 12/0848 711/129 |
| 8,055,960 B2 | 11/2011 | Huott et al. | |
| 8,364,899 B2 | 1/2013 | Ambroladze et al. | |
| 8,452,942 B2 | 5/2013 | Slegel et al. | |
| 8,806,179 B2 | 8/2014 | Greiner et al. | |
| 8,966,198 B1 | 2/2015 | Harris et al. | |
| 9,104,513 B1 | 8/2015 | Fee et al. | |
| 9,507,660 B2 | 11/2016 | Ambroladze et al. | |
| 9,594,689 B2 | 3/2017 | Ambroladze et al. | |
| 9,678,848 B2 | 6/2017 | Ambroladze et al. | |
| 9,703,661 B2 | 7/2017 | Ambroladze et al. | |
| 10,055,355 B1 | 8/2018 | Ambroladze et al. | |
| 10,437,729 B2 | 10/2019 | Ambroladze et al. | |
| 10,649,908 B2 | 5/2020 | Ambroladze et al. | |
| 2002/0087765 A1 | 7/2002 | Kumar et al. | |
| 2005/0283657 A1 | 12/2005 | Nishihara | |
| 2008/0163014 A1 | 7/2008 | Crawford et al. | |
| 2008/0189487 A1* | 8/2008 | Craske | G06F 12/0859 711/125 |
| 2009/0070532 A1 | 3/2009 | Bussa et al. | |
| 2009/0077425 A1 | 3/2009 | Gschwind et al. | |
| 2009/0182953 A1 | 7/2009 | Merkey et al. | |
| 2009/0204762 A1 | 8/2009 | Huott et al. | |
| 2009/0210629 A1 | 8/2009 | Blake et al. | |
| 2009/0300413 A1 | 12/2009 | Chang et al. | |
| 2010/0088550 A1 | 4/2010 | Imai et al. | |
| 2011/0320732 A1* | 12/2011 | Ambroladze | G06F 12/126 711/135 |
| 2012/0204010 A1 | 8/2012 | Greiner et al. | |
| 2012/0226667 A1 | 9/2012 | Volvovski et al. | |
| 2013/0097369 A1 | 4/2013 | Talagala et al. | |
| 2013/0145216 A1 | 6/2013 | Eggers et al. | |
| 2013/0179740 A1 | 7/2013 | Jeddeloh | |
| 2013/0339785 A1 | 12/2013 | Ambroladze et al. | |
| 2014/0006465 A1 | 1/2014 | Davis et al. | |
| 2014/0006849 A1 | 1/2014 | Ramirez et al. | |
| 2014/0095926 A1 | 4/2014 | Ambroladze et al. | |
| 2015/0039938 A1 | 2/2015 | Sivaramakrishnan et al. | |
| 2015/0261683 A1* | 9/2015 | Hong | G06F 12/0895 711/144 |
| 2015/0264153 A1* | 9/2015 | Anand | H04L 49/90 709/212 |
| 2016/0004587 A1 | 1/2016 | Agrawal et al. | |
| 2016/0232052 A1 | 8/2016 | Ambroladze et al. | |
| 2016/0232067 A1 | 8/2016 | Ambroladze | |
| 2016/0364312 A1 | 12/2016 | Ambroladze et al. | |
| 2017/0010965 A1 | 1/2017 | Hsu et al. | |
| 2017/0017577 A1 | 1/2017 | Slegel et al. | |
| 2017/0371816 A1 | 12/2017 | Klein et al. | |
| 2018/0046553 A1 | 2/2018 | Okamoto | |
| 2018/0218000 A1 | 8/2018 | Setty | |
| 2018/0307612 A1 | 10/2018 | Ambroladze et al. | |
| 2019/0251036 A1 | 8/2019 | Ambroladze et al. | |
| 2019/0251037 A1 | 8/2019 | Ambroladze et al. | |

FOREIGN PATENT DOCUMENTS

| | | |
|---|---|---|
| WO | 2008106095 A1 | 9/2008 |
| WO | 2009124320 A1 | 10/2009 |

OTHER PUBLICATIONS

IBM, "List of IBM Patent Applications Treated As Related", Appendix P, Dated Jan. 21, 2021, 2 pages.

Roberts, David Andrew, "c", a dissertation submitted in partial fulfillment of the requirements for the degree of Doctor of Philosophy in The University of Michigan, 2011, 170 pgs.

* cited by examiner

EFFICIENT EVICTION OF WHOLE SET ASSOCIATED CACHE OR SELECTED RANGE OF ADDRESSES

BACKGROUND

The present invention generally relates to data processing, and more specifically, to purging a cache of a multiprocessing computer system.

Computer systems implement a cache, which is a component that transparently retains data elements (or simply data) so that future requests for any retained data can be served faster. A data element that is stored within a cache corresponds to a pre-defined storage location within a computer memory system. Such a data element might be a value that has recently been computed or a duplicate copy of the same data element that is also stored elsewhere.

When multiple images are stored in computer systems, it is highly desirable to dynamically reallocate storage among the multiple images in order to increase storage sizes for images which need improved throughput. Therefore, it is necessary to purge cache entries which correspond to respective storage addresses being reallocated from existing images and into critical images. Typically, the storage addresses being reallocated include a large contiguous range of storage addresses. The purging of cache entries containing storage address being reallocated is required to be performed quickly to minimize any impact on the system performance. At times, it may be also necessary to purge the entire cache.

SUMMARY

Embodiments of the present invention are directed to a computer system. A non-limiting example of the computer system includes a cache and processor. The cache includes a plurality of data compartments configured to store data. The data compartments are arranged as a plurality of data rows and a plurality of data columns. Each data row is defined by an addressable index. The processor is in signal communication with the cache, and is configured to operate in a full cache purge mode or a selective cache purge mode. In response to invoking either the full cache purge mode or the selective cache purge mode, the processor performs a pipe pass on a selected addressable index to determine a number of valid compartments and a number of invalid compartments, and performs an eviction operation on the valid compartments while skipping the eviction operation on the invalid compartments.

Embodiments of the present invention are directed to a computer-implemented method for efficiently evicting data from a cache. A non-limiting example of the computer-implemented method includes storing data in a plurality of data compartments included in a cache. The data compartments are arranged as a plurality of data rows and a plurality of data columns, each data row defined by an addressable index. The method further comprises selectively operating a processor in a full cache purge mode or a selective cache purge mode. The method further comprises invoking the full cache purge mode or the selective cache purge mode, and performing, via the processor, a pipe pass on each addressable index to determine a number of valid compartments and a number of invalid compartments. The method further comprises performing an eviction operation on the valid compartments while skipping the eviction operation on the invalid compartments.

Embodiments of the invention are directed to a computer program product for efficiently evicting data from a cache. The computer program product comprising a computer readable storage medium having program instructions embodied therewith. The program instructions are executable by a processor to cause the processor to perform a method. The computer product comprises a computer readable storage medium embodied with program instructions. The instructions are executable by a hardware processor and cause the hardware processor to perform operations of storing data in a plurality of data compartments included in a cache. The data compartments are arranged as a plurality of data rows and a plurality of data columns, each data row defined by an addressable index. The operations further comprise selectively operating a processor in a full cache purge mode and a selective cache purge mode. The operations further comprise invoking the full cache purge mode or the selective cache purge mode, and performing, via the processor, a pipe pass on each addressable index to determine a number of valid compartments and a number of invalid compartments. The operations further comprise performing an eviction operation on the valid compartments while skipping the eviction operation on the invalid compartments.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
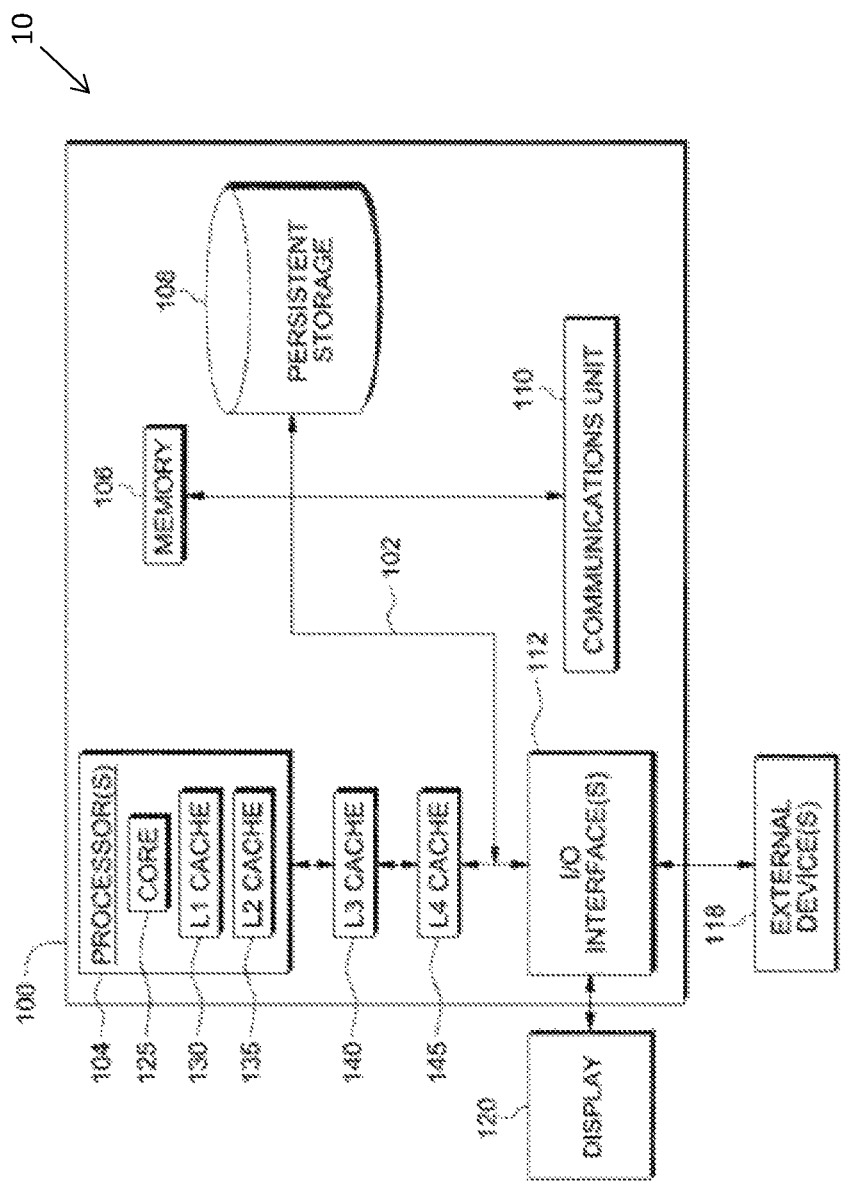
FIG. 1 depicts a functional block diagram illustrating a data processing environment, in accordance with a non-limiting embodiment of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based on the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, computer systems typically employ a cache eviction algorithm that performs a pipe pass is to check each index and each compartment. Most cache purges require the system to step through each addressable index and each compartment. This operation is time-consuming, and can be affected by the size of the cache. Even if the cache is half empty, the time it takes to step through it will be the same since each compartment has to be checked.

Various non-limiting embodiments described herein provide a computer system that includes a purge engine that performs a pipe pass for each addressable index in a cache so that each compartment state is read out. Unlike conventional purging engines, the purge engine described according to various embodiments selectively performs a full cache purge to evict a whole set associated with the cache or a selective cache purge to evict a selected range of addresses of the cache.

When performing a full cache purge, the purge engine collects a vector of valid compartments for an addressable index in the cycle after the directory results are available. When performing a selective purge, the purge engine compares the compartment's address against a selective range and that result is sent over to the purge engine. The purge engine collects a vector of valid and address matching compartments for this addressable index in the cycle after directory results are available. ANDing those two vectors together will result in a vector of valid compartments that will need to be evicted. Once the purge engine has a vector for the valid (and matched address if applicable) compartments, then it can load up controllers to evict only the lines that are valid, thus eliminating the need to do pipe passes for compartments that are not valid or do not match the selected range. Once all the compartments within the addressable index are ingated (e.g., loaded) into eviction controllers, the purge engine can move onto the next index. Accordingly, the total purge takes less time because it does not require the purge engine to check every compartment individually. In one or more embodiments, the system can load different controllers based on the needs of the line e.g., clean invalidation (line has not been changed) and/or data eviction (line has been updated in the cache vs memory copy).

Turning now to FIG. 1, a distributed data processing environment, generally designated 10, in accordance with one embodiment of the present invention. FIG. 1 depicts a block diagram of components of computing device 100, in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made.

Computing device 100 may be a management server, a web server, or any other electronic device or computing system capable of receiving and sending data, and processing program instructions. In some embodiments, computing device 100 may be a laptop computer, tablet computer, netbook computer, personal computer (PC), a desktop computer, or any programmable electronic device.

Computing device 100 includes communications fabric 102, which provides communications between core 125, cache (e.g., L1 cache 130, L2 cache 135, L3 cache 140, L4 cache 145), memory 106, persistent storage 108, communications unit 110, and input/output (I/O) interface(s) 112. Communications fabric 102 can be implemented with any architecture designed for passing data and/or control information between processors (such as microprocessors, communications, and network processors, etc.), system memory, peripheral devices, and any other hardware components within a system. For example, communications fabric 102 can be implemented with one or more buses or a crossbar switch.

Processor 104 may be a processor with one or more cores (e.g., core 125). In the depicted embodiment, processor 104 includes core 125, L1 cache 130, and L2 cache 135. Processor 104 may include any number of cache levels. Core 125 is an individual central processing unit (CPU) located on processor 104. In embodiments of the present invention, there may be any number of cores 125 within processor 104.

Memory 106 and persistent storage 108 are computer readable storage media. In this embodiment, memory 106 includes random access memory (RAM). In general, memory 106 can include any suitable volatile or non-volatile computer readable storage media.

Cache (e.g., L1 cache 130, L2 cache 135, L3 cache 140, L4 cache 145) is a fast memory that enhances the performance of computer processor(s) 104 by holding recently accessed data, and data near accessed data, from memory 106. In the depicted embodiment, L1 cache 130 and L2 cache 135 are located on processor 104. In the depicted embodiment, L1 cache 130 and L2 cache 135 are on-processor memory for caching data on processor 104. Processor 104 may be operatively connected to L3 cache 140, which in turn may be operatively connected to L4 cache 145. Data retrieved from memory 106 may be cached in any of the caches (e.g., L1 cache 130, L2 cache 135, L3 cache 140, L4 cache 145). Typically, the cache size increases as the cache level increases while the speed at which data can be accessed decreases as the cache level increases, primarily because lower level caches are located close to core 125 and/or processor 104. In the depicted embodiment, for example, L1 cache 130 is the smallest size cache and is the closest cache to core 125, while L4 cache 145 is the largest size cache and is the furthest away cache from core 125. While the depicted embodiment includes L1 cache 130, L2 cache 135, L3 cache 140, and L4 cache 145, it should be understood that different cache arrangements, in both number of cache levels and location within the system, are recognized by embodiments of the present invention. Further, it is recognized that some cache levels may be dedicated to core 125, while other cache levels are shared between core 125 and additional cores (not shown) of processor 104. FIG. 2 illustrates further details of L1 cache 130, L2 cache 135, L3 cache 140, and/or L4 cache 145, in accordance with an embodiment of the present invention.

Programs may be stored in persistent storage 108 and in memory 106 for execution by one or more of the respective computer processors 104 via L1 cache 130, L2 cache 135, L3 cache 140, and/or L4 cache 145. In an embodiment, persistent storage 108 includes a magnetic hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 108 may also be removable. For example, a removable hard drive may be used for persistent storage 108. Other examples include optical and magnetic disks, thumb drives, and smart cards that are inserted into a drive for transfer onto another computer readable storage medium that is also part of persistent storage 108.

Communications unit 110, in these examples, provides for communications with other data processing systems or devices. In these examples, communications unit 110 includes one or more network interface cards. Communications unit 110 may provide communications through the use of either or both physical and wireless communications links. Programs may be downloaded to persistent storage 108 through communications unit 110.

I/O interface(s) 112 allows for input and output of data with other devices that may be connected to computing device 100. For example, I/O interface 112 may provide a connection to external devices 118 such as a keyboard, keypad, a touch screen, and/or some other suitable input device. External device(s) 118 can also include portable computer readable storage media such as, for example, thumb drives, portable optical or magnetic disks, and memory cards. Software and data used to practice embodiments of the present invention can be stored on such portable computer readable storage media and can be loaded onto persistent storage 108 via I/O interface(s) 112. I/O interface(s) 112 also connect to a display 120. Display 120 provides a mechanism to display data to a user and may be, for example, a computer monitor.

Figure 2A:
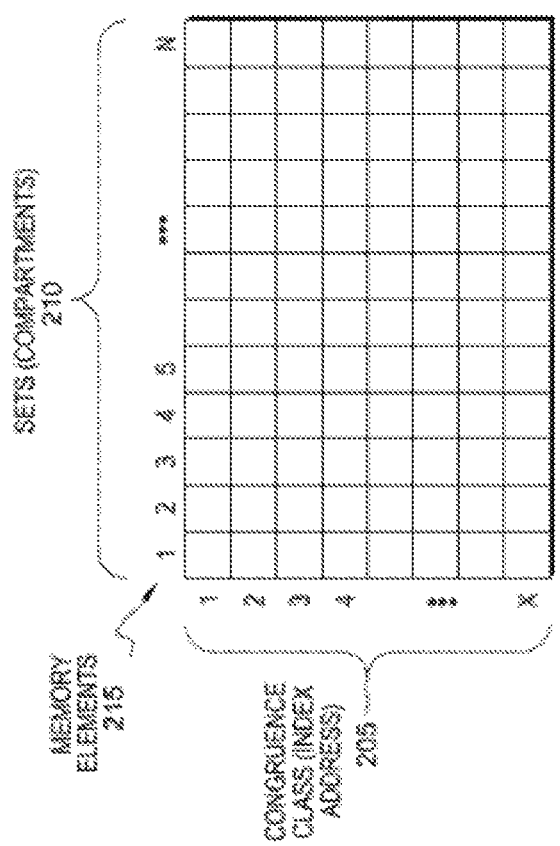
FIGS. 2A and 2B depict elements of a cache included in a computer system according to a non-limiting embodiment of the invention.
Figure 2B:
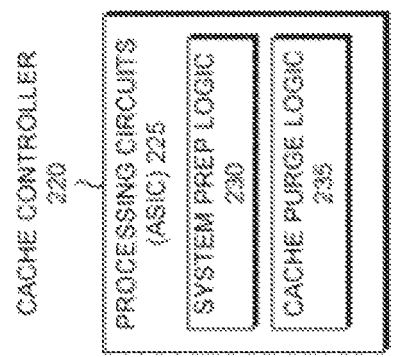

FIGS. 2A and 2B illustrate further details of L1 cache 130, L2 cache 135, L3 cache 140, and/or L4 cache 145, in accordance with a non-limiting embodiment of the present invention. As discussed herein, reference is made to L3 cache 140. However, the explanation may apply to L1 cache 130, L2 cache 135, and L4 cache 145, in embodiments of the invention.

L3 cache 140 (along with L1 cache 130, L2 cache 135, and L4 cache 145) may be an N-way set associative cache with 1-X congruence classes 205 (shown as rows) and 1-N sets (shown as columns) as understood by one skilled in the art. As discussed herein, each congruence class can also be referred to as an addressable index (or index) 205, and each set 210 can be referred to as a compartment.

In the depicted example, L3 cache 140 is a twelve-way set associative cache. There may be fewer or additional sets 210 in the cache. Twelve sets are used for explanation purposes.

L3 cache 140 has numerous memory elements 215, each of which stores data. The memory elements 215 also referred to as memory cells are integrated circuits for storing data. L3 cache 140 also includes a cache controller 220 that controls loading (writing), evicting, and reading (requesting) data in the memory elements 215 of the L3 cache 140. L3 cache 140 includes cache directory 20 (see FIG. 5) which maintains the state of each set (compartment) 210 and other applicable information on the data, such as an address. Cache controller 220 controls and makes updates to cache directory 20 as well as memory elements 215.

Cache directory 20 may have, for example, a grid of status indications, where each individual status indication represents a corresponding memory element 215 in the cache (e.g., L1 cache 130, L2 cache 135, L3 cache 140, L4 cache 145). Each set (compartment) 210 has corresponding bits that indicate the status: valid, invalid, empty, owned, offline, not to be used, etc. Further, cache directory 20 may indicate various sections within the cache. Such sections may be specified by a bit, and may include compartments from multiple indexes 205.

Cache controller 220 may include processing circuits 225 which may be application specific integrated circuits (ASIC) and various state machines (not shown). A state machine (e.g., finite-state machine (FSM) or finite-state automaton) reads a series of inputs. When the state machine reads an input it will switch to a different state. Each state specifies which state to switch for a given input.

For example, a state machine is a mathematical model used to design computer programs and digital logic circuits. A state machine can be in one of a finite number of states. A state machine is only one state at a time, and the state machine is in at any given time is called the current state.

The state can change from one state to another when initiated by a triggering event or condition, and this is called a transition. Each particular state machine is defined by a list of the possible transition states from each current state and by the triggering condition for each transition.

Various state machines have different roles that the various state machines are designed to fulfill. Various state machines may be used by a transaction or operation to access data stored in memory elements 215. Various state machines can access memory elements 215 (i.e., access the cache) for processor 104 (e.g., core 125, an application in memory 106).

For each set (compartment) 210, cache directory 20 contains information about the status indication of the corresponding memory element 215. Each of the directory statuses for sets 1-N in a specific congruence class 205 are read out each time a state machine or logic (e.g., hardware logic, software logic) accesses L3 cache 140. In one embodiment, each of the directory statuses for a section of L3 cache 140 are read out each time a state machine or logic accesses the section of L3 cache 140.

Cache controller 220 includes system prep logic 230 and cache purge logic 235. The cache purge logic 235 operates to execute a full or selective purge sequence. The system prep logic 230 operates to temporarily quiesce computing device 100 while setting up cache purge logic 235 to prevent window conditions with different drawers from starting the selective purge sequence at different times. System prep logic 230 also operates to initiate cache purge logic 235. System prep logic 230 may be hardware or software logic. In some embodiments, system prep logic 230 is executed by cache controller 220 which can include various state machines and/or millicode that may be configured to perform the actions.

Figure 3:
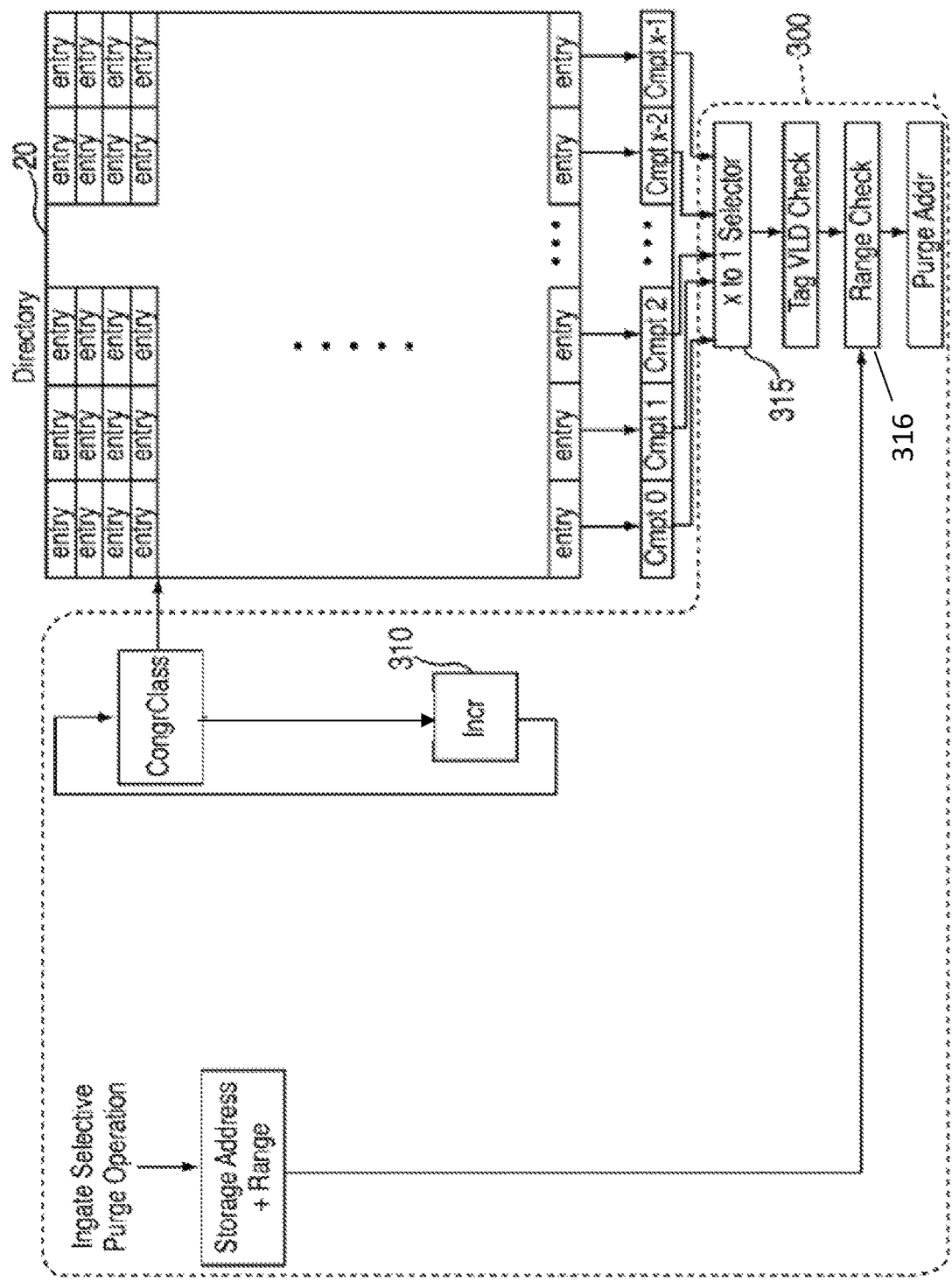
FIG. 3 depicts additional details of cache purge logic, in accordance with an embodiment of the present invention.

Referring now to FIG. 3, a purge engine logic unit 300 (referred to as a purge engine 300) is illustrated according to a non-limiting embodiment. The purge engine logic unit 300 includes a congruence class incrementer 310, and a valid directory compartment vector 315 which contains valid compartments corresponding to entries of the cache directory 20. In selective purge embodiments, the range check, 316 is also used to create the valid and applicable compartment vector 315. The purge engine logic unit 300 can be constructed as a hardware controller that includes memory for storing cache eviction logic algorithms. The congruence class incrementer 310, directory compartment selector 315, and range check 316 can be constructed as sub-controllers that operate in conjunction with the purge engine logic unit to perform the eviction logic algorithms and purge operations described herein.

When the system determines to purge entries in the cache directory 20, as mentioned above, a starting storage address and a length of the storage address range to be purged are loaded into the purge engine 300. The purge engine 300, steps through all the congruence classes and accesses the cache directory 20 for each one, one at a time, using the congruence class incrementor 310 to keep track of searched congruence classes and to be done. Once all the entries are read out for a congruence class out of the cache directory 20, the valid and applicable compartment vector 316 is created based on following criteria: compartment is valid, within address range (if selective purge embodiment), data changed and require eviction. The valid and applicable compartment vector 316 is picked up by the purge engine 300 and it loads corresponding controllers 220 for each active compartment in the valid and applicable compartment vector 316.

In a different embodiment, multiple valid and applicable compartment vectors 316 can be created depending on the type of controllers available to be used to invalidate and/or evict the lines. Examples are valid and changed data compartments will be stored in one vector so that eviction controllers will be used to evict those lines. Another vector would contain all compartments that are valid but do not have changed data and thus only need invalidation. Those compartments will be invalidated by controllers that can updated the cache directory 20 but do not require data movement. This allows purge to complete faster since there are more resources that can process multiple compartments in parallel.

Once all the valid compartments are loaded into the controllers for the congruences class, the purge engine 300, increments the congruence class and goes through the process again. This is done for each of the congruence classes in the cache directory 20.

Once all the congruence classes have been looked up and all the valid compartments have been loaded into the controllers to invalidate or evict the lines, the purge engine 300 waits until all controllers have completed their operation and indicates back to the system (can be hw or sw) that the purge operation is completed.

As described herein, the purge engine 300 is configured to selectively perform a full cache purge to evict a whole set associated with the cache or a selective cache purge to evict a selected range of addresses of the cache. The full purge or selective purge can be initiated by software or hardware. Accordingly, the purge engine 300 performs a pipe pass on given addressable index (congruence class) and reads out the data in each compartment included in the addressable index (congruence class). The data read out includes compartment's address, along with other compartment state data including, but not limited to, a valid or invalid state, a changed or unchanged state, and a cross-invalidation (XI) required or XI non-required status. The purge engine 300 then compares the compartment's address against the range of addressable indexes. The comparison allows the purge engine 300 to generate a vector of valid and address-matching compartments/sets for the addressable index/congruence class currently undergoing the pipe pass after directory results are available.

Once the purge engine 300 generates a vector for the valid compartments, the purge engine can load one or more cache controllers 220 to evict valid address lines included in the targeted range of addressable index, while skipping or disregarding the invalid compartments and/or those addressable indexes excluded from the targeted range of addressable indexes. When all the compartments within the addressable index are ingated, into the cache controller 220, the purge engine 300 proceeds to the next addressable index. In one or more non-limiting embodiments, the purge engine 300 is not required to wait for the cache controller 220 to complete evicting the valid compartments most recently pipe passed addressable index before proceeding to the next addressable index.

Figure 4:
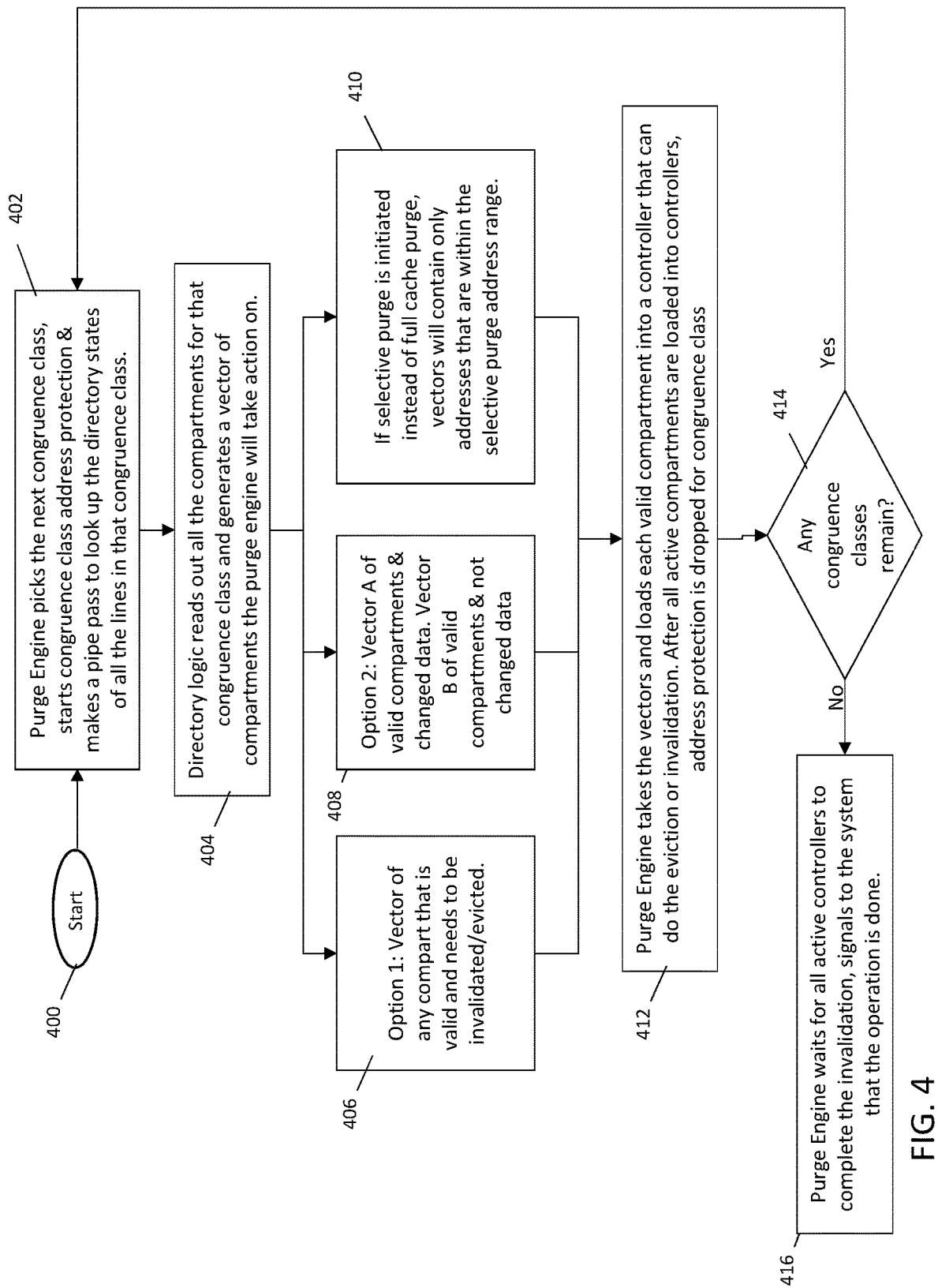
FIG. 4 illustrates a flow diagram depicting a method of efficiently evicting either a whole set associated with a cache or a selected range of addresses of the cache according to a non-limiting embodiment.

Referring to FIG. 4, a method performed by the purge engine 300 to efficiently evict either a whole set associated with a cache or a selected range of addresses of the cache is illustrated according to a non-limiting embodiment. The method begins at operation 400. At operation 402, the purge engine selects the next congruence class, starts address protection for that congruence class and performs a pipe pass on the current addressable index and reads out the compartment state data for each compartment. The compartment state data indicates various states of a given compartment including, but not limited to, a valid state, an invalid state, a changed state, an unchanged state, an XI required status, an XI non-required status, a match selective purge range state, and a mismatched selective purge range state. At operation 404, directory logic reads out all the compartments for the congruence class and generates a vector of compartments the purge engine will take action on.

At operation 406, for example, if a full purge is initiated, a vector is generated for any compartment that is valid and needs to be invalidated or evicted. At operation 408, if a full purge is initiated, a first vector ("Vector A") is generated for valid compartments and changed data. A second vector ("Vector B") is generated for valid compartments and unchanged data. At operation 410, if a selective purge is initiated instead of a full purge, vectors are generated that contain only addresses that are within the selective purge address range.

At operation 412, the purge engine loads the tagged valid compartments, while ignoring or skipping loading of the invalid compartments at operation. After all compartments for that congruence class are loaded into controllers, the purge engine drops the congruence class protection since controllers are protecting individual lines.

At operation 414 a determination is made as to whether any addressable indexes in the cache remain for performing a pipe pass. When there are one or more remaining addressable indexes, the purge engine proceeds to the next addressable index at operation 402 and repeats the operations described above. When, however, no addressable indexes remain at operation the purge engine waits for all active controllers to complete the invalidation, and signals to the system that the operation is complete at operation 416.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for efficiently evicting data from a cache, the method comprising:
    storing data in a plurality of data compartments included in a cache, the data compartments arranged as a plurality of data rows and a plurality of data columns, each data row defined by an addressable index;
    selectively operating a processor in a full cache purge mode and a selective cache purge mode;
    invoking the full cache purge mode or the selective cache purge mode;
    prior to performing an eviction operation, performing via the processor, a pipe pass on each addressable index corresponding to each of the data rows to determine a number of valid compartments and a number of invalid compartments; and
    after completing the pipe pass, performing the eviction operation on the valid compartments while skipping the eviction operation on the invalid compartments.

2. The computer-implemented method of claim 1, further comprising purging data completely from a given compartment among the valid compartments in response to performing the eviction operation.

3. The computer-implemented method of claim 1, wherein in response to invoking a cache purge, the pipe pass is performed on each addressable index to determine a number of valid compartments for full cache purge mode or number of valid compartments that have addresses in a selective address range for selective cache purge mode.

4. The computer-implemented method of claim 1, further comprising
    obtaining compartment state data of each compartment included in the addressable index in response to performing the pipe pass;
    determining the valid and invalid compartments based on the compartment state data;
    loading a cache controller with the valid compartments after completing the pipe pass while excluding the invalid compartments; and
    performing the eviction operation, via the cache controller, on the loaded valid compartments so as to exclude the invalid compartments from the eviction operation.

5. The computer-implemented method of claim 4, wherein the compartment state data comprises a valid or invalid state, a changed or unchanged state, and a cross-invalidation (XI) required or XI non-required status.

6. The computer-implemented method of claim 1, further comprising invoking an address index protection operation on the addressable index prior to performing the pipe pass, and removing the address index protection operation from the addressable index in response to completing the pipe pass.

7. The computer-implemented method of claim 4, further comprising loading different cache controllers with different compartments based on the compartment state data of the compartments.

8. A computer system comprising:
    a cache including a plurality of data compartments configured to store data, the data compartments arranged as a plurality of data rows and a plurality of data columns, each data row defined by an addressable index;
    a processor in signal communication with the cache, the processor configured to operate in a full cache purge mode and a selective cache purge mode,
    wherein in response to invoking the full cache purge mode or the selective cache purge mode, the processor performs a pipe pass on a selected addressable index corresponding to each of the data rows prior to performing an eviction operation, the pipe pass configured to determine a number of valid compartments and a number of invalid compartments, and after completing the pipe pass the processor performs the eviction operation on the valid compartments while skipping the eviction operation on the invalid compartments.

9. The computer system of claim 8, wherein the eviction operation purges data completely from a given compartment among the valid compartments.

10. The computer system of claim 8, wherein in response to invoking a cache purge, the pipe pass is performed on each addressable index to determine a number of valid compartments for full cache purge mode or number of valid compartments that have addresses in a selective address range for selective cache purge mode.

11. The computer system of claim 8, wherein the processor obtains compartment state data of each compartment included in the addressable index in response to performing the pipe pass; determines the valid and invalid compartments based on the compartment state data, loads a cache controller with the valid compartments after completing the pipe pass while excluding the invalid compartments,
    wherein the cache controller performs the eviction operation on the loaded valid compartments so as to exclude the invalid compartments from the eviction operation.

12. The computer system of claim 11, wherein the compartment state data comprises a valid or invalid state, a changed or unchanged state, and a cross-invalidation (XI) required or XI non-required status.

13. The computer system of claim 8, wherein the processor invokes an address index protection operation on the addressable index prior to performing the pipe pass, and removes the address index protection operation from the addressable index in response to completing the pipe pass.

14. The computer system of claim 11, further comprising a plurality of cache controllers, wherein the processor loads different cache controllers among the plurality of cache controllers with different compartments based on the compartment state data of the compartments.

15. A computer program product for efficiently evicting data from a cache, the computer program product comprising a computer readable storage medium having program instructions embodied therewith, the instructions executable by a processor to cause the processor to perform operations of:

storing data in a plurality of data compartments included in a cache, the data compartments arranged as a plurality of data rows and a plurality of data columns, each data row defined by an addressable index;

selectively operating a processor in a full cache purge mode and a selective cache purge mode;

invoking the full cache purge mode or the selective cache purge mode;

prior to performing an eviction operation, performing, via the processor, a pipe pass on each addressable index corresponding to each of the data rows to determine a number of valid compartments and a number of invalid compartments; and after completing the pipe pass, performing the eviction operation on the valid compartments while skipping the eviction operation on the invalid compartments.

16. The computer program product of claim 15, wherein the eviction operation purges data completely from a given compartment among the valid compartments.

17. The computer program product of claim 15, wherein in response to invoking a cache purge, the pipe pass is performed on each addressable index to determine a number of valid compartments for full cache purge mode or number of valid compartments that have addresses in a selective address range for selective cache purge mode.

18. The computer program product of claim 15, wherein the operations further comprise:

obtaining compartment state data of each compartment included in the addressable index in response to performing the pipe pass;

determining the valid and invalid compartments based on the compartment state data;

loading a cache controller with the valid compartments after completing the pipe pass while excluding the invalid compartments; and performing the eviction operation, via the cache controller, on the loaded valid compartments so as to exclude the invalid compartments from the eviction operation.

19. The computer program product of claim 15, wherein the operations further comprise invoking an address index protection operation on the addressable index prior to performing the pipe pass, and removing the address index protection operation from the addressable index in response to completing the pipe pass.

20. The computer program product of claim 18, further comprising loading different cache controllers with different compartments based on the compartment state data of the compartments.

* * * * *